United States Patent Office 3,093,670
Patented June 11, 1963

---

3,093,670
COORDINATION COMPOUNDS AND USE THEREOF
Herbert Giles Tanner, R.F.D. 3, Box 70, Frederick, Md.
No Drawing. Original application Aug. 7, 1957, Ser. No. 676,712, now Patent No. 2,980,583, dated Apr. 18, 1961. Divided and this application Feb. 28, 1961, Ser. No. 105,247
5 Claims. (Cl. 260—431)

This invention pertains to improvements in treatment of dermatoses, and to improved compositions thereof. This application is a division of Serial No. 676,712, filed August 7, 1957, now U.S. Patent No. 2,980,583.

This invention is beneficial in treatment of animal dermatoses as well as being applicable to human dermatoses, particularly parakeratotic dermatoses which include such maladies as psoriasis and ringworm.

In attending to parakeratotic dermatoses it is desirable to arrest progress of the malady, and to erradicate the scaly matter of the afflicted skin without formation of scar tissue. Furthermore, it is important to preserve the health of adjacent normal skin, and to avoid injury to new skin that is trying to grow beneath the parakeratotic area.

A particular objective of this invention is to exert a selective action on unhealthy dermal tissue without interfering with the natural processes by which normal skin replaces abnormal skin.

According to this invention, this objective and others are accomplished by applying to the afflicted dermal area certain products of coordination reactions of strongly basic hydrocarbon monoamines and mercuric salts. This invention pertains also to certain new coordination compounds. The coordination reaction products concerned in this invention have the general formula $HgX_2 \cdot nA$, wherein X represents an anion from the group comprising chloride and bromide, n represents the coordination number, and A represents a strongly basic hydrocarbon monoamine. A strongly basic hydrocarbon monoamine is defined for the purposes of this invention as one having a dissociation constant for OH-ion greater than $1 \times 10^{-5}$ when tested in aqueous solution.

With reference to the formula given above the preferred anion for X is chloride, the preferred coordination number for n is 2, and the preferred strongly basic hydrocarbon monomine for A is an aliphatic hydrocarbon primary monoamine, especially butylamine.

Examples for illustration, but without limitation, of strongly basic hydrocarbon monoamines are: triethylamine, butylamine (including normal, iso, and tertiary butyl), propylamine, piperidine.

An example for illustration of a preferred coordination compound for the purposes of this invention, but without limitation, is $HgCl_2 \cdot 2C_4H_9NH_2$, which has the probable structure

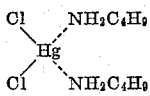

in which the primary valences are shown by solid lines, and the accondary valences are shown by dashed lines. Two secondary valences establish the coordination number as being 2. It would be ambiguous to call this compound dibutylaminemercuric chloride. I, therefore, call it bis-butylaminemercuric chloride.

One method of preparing a mercuric salt coordination compound applicable under this invention is to dissolve appropriate molar portions of mercuric salt and monoamine in separate portions of solvent. The two solutions are mixed at ambient temperature. The precipitate formed is concentrated by filtration, washed with fresh solvent, and dried. Preferred solvents are ethanol and methanol because they have a relatively low dielectric constant which represses ionization. Coordination reactions pertinent to this invention occur between neutral molecules. Excessive ionization tends to interfere with the course of the coordination reaction.

The following examples illustrate, but without limitation, the manner of preparing coordination compounds useful under this invention.

*Example I*

14.6 grams of butylamine, $C_4H_9NH_2$, dissolved in 25 ml. of ethanol is mixed with a solution of 27.2 grams of mercuric chloride dissolved in 90 ml. of ethanol. The precipitate formed is concentrated by filtration, washed with ethanol, and dried. The molor portions of the reactants in this instance are 2 of butylamine and 1 of mercuric chloride. The product is substantially

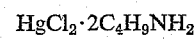

bis-butylaminemercuric chloride.

*Example II*

14.6 grams of butylamine, $C_4H_9NH_2$, dissolved in 25 ml. of methanol is mixed with a solution of 36.0 grams of mercuric bromide dissolved in 250 ml. of methanol. The precipitate formed is concentrated by filtration, washed with methanol, and dried. The product is substantially $HgBr_2 \cdot 2C_4H_9NH_2$, bis-butylaminermercuric bromide.

*Example III*

17.4 grams of amylamine, $C_5H_{11}NH_2$, dissolved in 25 ml. of methanol is mixed with a solution of 27.2 grams of mercuric chloride dissolved in 75 ml. of methanol. The precipitate is concentrated by filtration, washed with methanol, and dried. The product is substantially

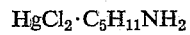

bis-amylaminemercuric chloride.

Coordination compounds disclosed in this invention are powders which may be applied directly as a thin layer of dust to parakeratotic dermal tissue four times daily for a period of several weeks. They are applicable to humans as well as to animals. Also, they are effective when applied in a carrier. Preferred carriers have a liquid to semisolid consistency. Examples, but without limitation, of suitable carriers are lotions, magma, ointments, pastes, lanolin, petrolatum jelly, polyethylene glycols. A hydrophilic carrier buffered to a pH between 4 and 5 is desirable for application to human skin. A carrier containing about 5 percent by weight of coordination compound disclosed in this application is a satisfactory composition for average treatment of parakeratotic skin.

The following specific examples illustrate, but without limitation, the manner of preparation and the mode of applying compositions comprising carrier and coordination compounds disclosed in this application.

*Example IV*

Blend 64 grams of bis-butylaminemercuric chloride into 1 kg. of hydrophilic ointment U.S.P. XV (1955) that has been buffered to a pH between 4 and 5 with 15 ml. of standard Burow's solution U.S.P. XV (1955).

After removing, with the aid of a soap wash, the scaly matter that has accumulated on a psoriatic area, apply the composition with the fingers to the afflicted skin, taking care that all of the afflicted area is uniformly covered with a thin layer of the composition. Repeat the treatment four times daily for a period of four to twelve weeks as determined by the individual clinical picture.

Applications made in this manner do not injure healthy skin surrounding the afflicted skin, nor interfere with natural processes of replacement of afflicted skin by healthy skin. The treated area becomes normal, and is devoid of scar tissue.

*Example V*

Blend 64 grams of bis-butylaminemercuric bromide into 1 kg. of bentonite magma U.S.P. XV (1955). Useful application of this composition is made in the manner described in Example IV.

*Example VI*

Blend 64 grams of bis-amylaminemercuric chloride into 1 kg. of white petrolatum jelly U.S.P. Useful application of this composition is made in the manner described in Example IV.

In this application I have described guiding principles with illustrative examples for assisting the practical preparation and the use of several specific compositions under this invention in accordance with Patent Statutes. Those skilled in the art will now be able to apply variations and alternatives, under this invention, within the scope of the appended claims.

What is claimed is:
1. Bis-butylaminemercuric halide of the group consisting of the chloride and the bromide thereof.
2. Bis-butylaminemercuric chloride.
3. Bis-butylaminemercuric bromide.
4. The method of forming a coordination reaction product of a strongly basic hydrocarbon monoamine and a mercuric salt selected from the group consisting of mercuric chloride and mercuric bromide comprising reacting an ethanolic solution of said amine with an ethanolic solution of said mercuric salt, said amine and mercuric salt being in a molar ratio of 2:1.
5. The method of forming a coordination reaction product of butylamine and mercuric halide selected from the group consisting of mercuric chloride and mercuric bromide comprising reacting an ethanolic solution of butylamine with an ethanolic solution of said mercuric halide said butylamine and said mercuric halide being in a molar ratio of 2:1.

References Cited in the file of this patent
UNITED STATES PATENTS
1,919,732   Kharasch _____ July 25, 1933